M. W. THOMPSON.
CLUTCH.
APPLICATION FILED NOV. 5, 1910.
1,001,708.
Patented Aug. 29, 1911.
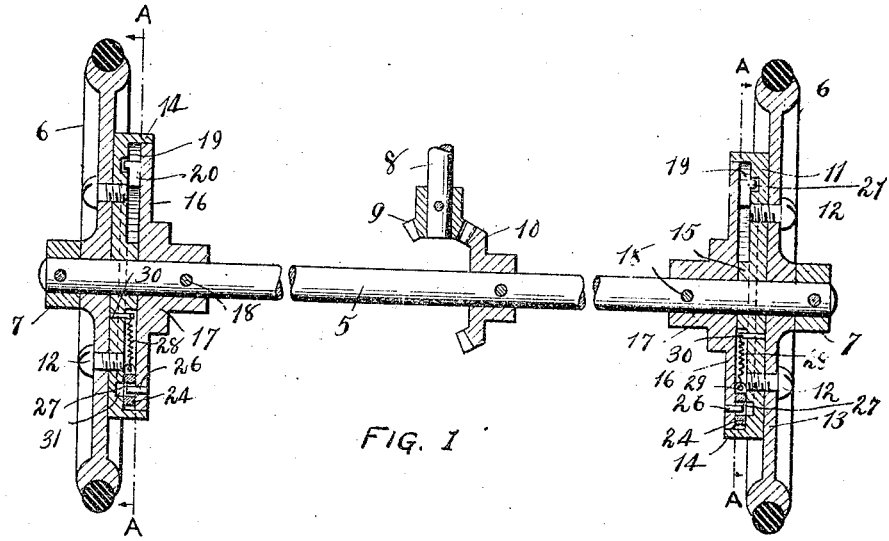
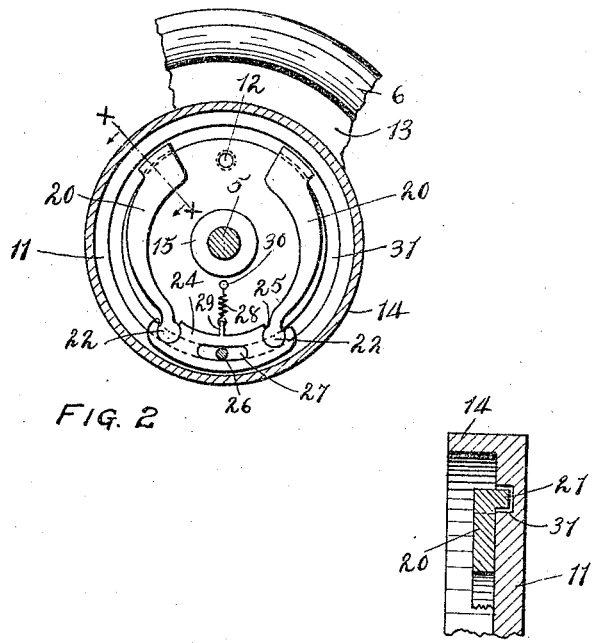
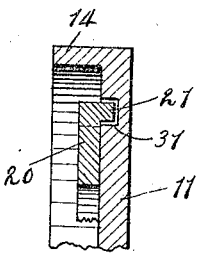
WITNESSES:
Wm G Blomstran.
M. A. Milord
INVENTOR
M. W. Thompson
BY Frederick Benjamin
ATT'Y.

UNITED STATES PATENT OFFICE.

MARTIN W. THOMPSON, OF HAMMOND, INDIANA.

CLUTCH.

1,001,708.     Specification of Letters Patent.     Patented Aug. 29, 1911.

Application filed November 5, 1910. Serial No. 590,792.

*To all whom it may concern:*

Be it known that I, MARTIN W. THOMPSON, citizen of the United States, residing at Hammond, in the county of Lake and State of Indiana, have invented certain new and useful Improvements in Clutches, of which the following is a specification.

My invention relates to clutch devices and has especial reference to appliances adapted to differentiate the relative movement of coöperating rotary members.

The chief objects of the improvements which form the subject matter of this application for patent are:—to provide a simple effective and reliable clutch mechanism, that will be automatic in its action and, having few parts, can be manufactured economically.

Another important feature of my invention lies in the compactness of the appliance, which especially adapts it for use upon automobiles.

A further object is to provide a closely fitting casing for the working parts, which is not only neat in appearance but affords a protection to the clutch members, preventing the entrance of dust, or dirt.

In the application of this invention to the differentiation of the movements of the wheels of a vehicle mounted upon the same axle, as demonstrated hereinafter, not only is the positiveness of the automatic movements of great utility, but especially the quickness of the action, a very slight movement of the operative parts sufficing to engage or release the locking members.

I accomplish the desired objects above enumerated, and others of practical benefit by employing the mechanical construction illustrated in the accompanying drawing, which forms a part of this application, the important details of the mechanism and manner of assembling and applying the apparatus being disclosed in the following views:—

Figure 1 is a sectional view of a pair of wheels mounted upon an axle to which my improved differential clutch mechanism is applied; Fig. 2 is a sectional view, taken on the line A—A of Fig. 1; Fig. 3 is a view showing the clutch mechanism in operative position, and Fig. 4 is a fragmentary section, enlarged, taken on the line x—x of Fig. 2.

Referring to the details of the drawing, the numeral 5 indicates an automobile axle, having traction wheels 6 mounted loosely upon the opposite ends, and retaining collars 7 secured outside the wheels. The said axle is driven in the usual way, the connection to the motor (not shown) being made by means of a shaft 8, carrying a miter pinion 9 meshing with a gear 10 keyed upon the axle.

Upon the inner face of each wheel is concentrically mounted a circular clutch plate 11, secured by bolts or screws 12, to the wheel web 13. The said plate is furnished with a peripheral flange 14 and a central hub 15. Fitting to turn within the said flange and bearing against the inner end of the disk hub 15 is a disk 16, furnished with a hub 17 secured to the axle by a bolt or pin 18. When the parts are assembled as shown in the drawing there will be an annular space or recess 19 between the approximated faces of the plate and disk, and in this space are mounted two coöperating clutch arms 20, arranged upon opposite sides of the center. These arms are somewhat curved to conform to the shape of the inclosing walls, and lie flat against the faces of the clutch plate and disk being loosely fitted so as to slide easily between them. The arms 20 taper from one end to the other, the larger end having a lug or flange 21 projecting at a right angle to form a gripping jaw the action of which will be explained. The opposite smaller end of each arm is furnished with a circular head 22. The said arms are coupled together by a link plate 24, having a circular notch 25 at each end adapted to receive the heads 22 which are loosely fitted therein forming hinges which permit the arms 20 to have a desirable amount of play. The said link plate 24 is retained in place by a stop pin 26, fixed in the disk 16 and projecting into a slot 27 in said link, allowing the latter to have a limited movement between the plate 11 and disk 16. The said link is held under tension by means of a spring 28 one end of which is attached to a lug 29 projecting from the link, and the other fastened to a pin 30 secured to the plate 11. The face of the clutch plate is provided with an annular concentric groove 31, which is engaged by the flanges or jaws 21 on the arms 20. The action of the spring 28 is to hold the link 24 in the intermediate position shown in Fig. 2 where the link is free to be moved thereby, thus throwing the clutch arms to their inoperative position. When the link is thrown in either direction by the pin 26, the tendency of the spring will be to swing the link on the said pin as a center and thus cause the jaws to bind in the groove 31.

It will be readily seen that when the wheels are revolved in either direction, independently of the axle there will be no effect upon the clutch, as the spring 28 will swing the link plate to the intermediate position (Fig. 2) but whenever the axle is turned the attached disk 16, through the medium of the pin 26 will carry the link plate laterally, causing the jaws 21 to bind against the curved walls of the groove 31, as shown in Fig. 3, and as a consequence the wheel 5 will turn with the axle. When the vehicle is advancing in a straight line it will be evident that both wheels will revolve at substantially the same rate. Whenever the angle of inclination of the axle relative to the line of travel is changed as in turning a corner or moving in a circle, the outer wheel will tend to turn faster than the inner since it travels in a larger arc, and this movement will carry the link plate away from its contact with the stop pin 26 in that wheel, thus permitting the spring 28 to throw the arms to their intermediate position, shown in Fig. 2, so that the wheel will have an independent movement. As soon as its rate of motion becomes less than that of the axle, the pin 26 will engage the end of its slot 27, and cause the clutch jaws to again bind in the groove, operatively locking the wheel and axle together as before.

Although I have shown my improved clutch as applied to automobile running gear, I do not wish to limit the device to such use, as it is equally applicable wherever the motion of a rotating member is to be interruptedly applied to a movable part.

Having thus described my invention, what I claim as new, is:—

1. In a clutch, the combination with a rotatable member having a concentric groove, of a pair of clutch members adjacent said plate, jaws on said members adapted to frictionally engage the walls of said groove, a link pivotally connecting said clutch members, a spring adapted to retain the said members in inoperative position, and means for operating said jaws, said means comprising a rotating member, and a projection thereon engaging said link.

2. In a clutch, the combination with a rotatable plate having a concentric groove in one lateral face, of a pair of clutch arms, jaws on said arms engaging said groove, a link pivotally connecting said arms, a spring adapted to retain said arms in inoperative position, a rotary member mounted concentrically with said rotatable plate, and a lug on said rotary member engaging a slot in said link.

3. In a clutch, the combination with a rotatable plate having a concentric groove in one lateral face, of a rotary disk mounted concentric with said plate, a pair of clutch members arranged between said plate and disk, jaws on said members engaging said groove, a link connecting said arms, a spring connecting said link with a fixed point on said plate, and a pin on said disk engaging a slot in said link.

4. In a clutch, the combination with a rotatable plate having a concentric groove in one lateral face, of a rotary disk mounted concentric with said plate, a pair of clutch members arranged between said plate and disk upon opposite sides of the axis, jaws on the ends of said members and engaging said groove, a link connecting the opposite ends of said arms, a lug on said rotary disk engaging a slot in said link, and a spring attached at one end to said link intermediate the ends, and having the other end secured to the rotatable plate.

5. In a clutch, the combination with a shaft, and a circular plate mounted to rotate on said shaft, said plate having a concentric groove formed in one lateral face, a peripheral flange on said plate, a disk fixed on said shaft and fitting within said flange, a pair of clutch arms arranged upon opposite sides of the axis between said plate and disk, a link pivotally connecting the ends of said arms, jaws on said arms projecting into said groove, and adapted to frictionally engage the walls of the groove, a spring for the link adapted to retain the jaws in inoperative position, and means for engaging said jaws, said engaging means consisting of a pin fixed in said disk and engaging a slot in said link.

In testimony whereof I affix my signature in the presence of two witnesses.

MARTIN W. THOMPSON.

Witnesses:
 G. C. WHITE,
 JACOB LINN.